United States Patent
Bonnal Conduzorgues et al.

(10) Patent No.: US 12,367,055 B2
(45) Date of Patent: Jul. 22, 2025

(54) METHOD AND A SYSTEM FOR MANAGING THE COMPUTING RESOURCES OF A CLOUD COMPUTING PLATFORM

(71) Applicant: AMADEUS S.A.S., Biot (FR)

(72) Inventors: Sylvain Bonnal Conduzorgues, Saint Jeannet (FR); Gilles Gagniard, Roquefort les Pins (FR); Olivier Favorel, Valbonnes (FR); Cyril Dioli, Grasse (FR); Marion Achimoff, Antibes (FR)

(73) Assignee: AMADEUS S.A.S., Biot (FR)

( * ) Notice: Subject to any disclaimer, the term of this patent is extended or adjusted under 35 U.S.C. 154(b) by 887 days.

(21) Appl. No.: 17/422,694

(22) PCT Filed: Jan. 15, 2020

(86) PCT No.: PCT/EP2020/050927
§ 371 (c)(1),
(2) Date: Jul. 13, 2021

(87) PCT Pub. No.: WO2020/148342
PCT Pub. Date: Jul. 23, 2020

(65) Prior Publication Data
US 2022/0121467 A1    Apr. 21, 2022

(30) Foreign Application Priority Data

Jan. 15, 2019  (FR) .................................. 1900346

(51) Int. Cl.
*G06F 9/455* (2018.01)
*G06F 9/50* (2006.01)

(52) U.S. Cl.
CPC ........ *G06F 9/45558* (2013.01); *G06F 9/5077* (2013.01); *G06F 2009/45562* (2013.01); *G06F 2009/4557* (2013.01)

(58) Field of Classification Search
CPC ............... G06F 9/45558; G06F 9/5077; G06F 2009/45562; G06F 2009/4557; G06F 9/5072
See application file for complete search history.

(56) References Cited

U.S. PATENT DOCUMENTS 11,537,439 B1 *  12/2022  Liberty ................. G06F 9/5077
2011/0119381 A1 *  5/2011  Glover ................. G06F 9/5072
709/226

(Continued)

OTHER PUBLICATIONS

PCT International Search Report, Mar. 5, 2020 re PCT International Patent Application No. PCT/EP2020/050927.

(Continued)

*Primary Examiner* — Kevin L Young
*Assistant Examiner* — Phuong N Hoang
(74) *Attorney, Agent, or Firm* — Perry + Currier Inc (57) ABSTRACT

The present invention relates to a system for managing the computing resources of a cloud computing platform comprising a plurality of Virtual Machine (VM) clusters each comprising a plurality of Virtual Machine (VM) instances, each configured to run at least one software application instance. The system comprises a monitoring module configured for determining a resource utilisation value for each VM instance and an elasticity module configured for adjusting the number of VM instances and/or software application instances in the VM cluster. The monitoring module is configured to determine, based on the user requests received at the communication interface, a cluster resource utilisation value, which is used by the elasticity module to adjust the number of VM instances and/or software application instances to maintain the resource utilisation value of each VM instance within the target value range.

19 Claims, 8 Drawing Sheets

(56) References Cited

U.S. PATENT DOCUMENTS

| | | | |
|---|---|---|---|
| 2011/0258621 A1* | 10/2011 | Kern | G06F 9/45558 718/1 |
| 2012/0179446 A1* | 7/2012 | Tylutki | G06F 11/3442 703/21 |
| 2013/0111468 A1* | 5/2013 | Davis | G06F 9/5077 718/1 |
| 2013/0174149 A1* | 7/2013 | Dasgupta | G06F 9/5077 718/1 |
| 2014/0006844 A1* | 1/2014 | Alderman | G06F 11/0709 714/4.1 |
| 2014/0123142 A1* | 5/2014 | Huh | G06F 9/45533 718/1 |
| 2014/0304024 A1* | 10/2014 | Carenza | G06Q 10/105 705/7.24 |
| 2015/0106520 A1* | 4/2015 | Breitgand | G06F 9/45558 709/226 |
| 2015/0350103 A1* | 12/2015 | Bertram | H04L 41/5054 709/226 |
| 2015/0373096 A1* | 12/2015 | Chandrasekaran | H04W 4/023 709/226 |
| 2016/0021019 A1* | 1/2016 | Parikh | H04L 41/0896 709/226 |
| 2016/0055038 A1* | 2/2016 | Ghosh | H04L 47/781 718/105 |
| 2016/0162317 A1 | 6/2016 | Doherty et al. | |
| 2016/0170792 A1* | 6/2016 | Kato | G06F 9/5077 718/1 |
| 2018/0067778 A1 | 3/2018 | Hawilo et al. | |
| 2018/0109610 A1* | 4/2018 | Einkauf | H04L 41/0897 |
| 2018/0113748 A1* | 4/2018 | Pagade | H04L 67/1095 |
| 2018/0210764 A1* | 7/2018 | Greeff | G06F 9/46 |
| 2019/0163517 A1* | 5/2019 | Fontoura | G06N 20/00 |

OTHER PUBLICATIONS

PCT Written Opinion of the International Searching Authority, Mar. 5, 2020 re PCT International Patent Application No. PCT/EP2020/050927.

* cited by examiner

METHOD AND A SYSTEM FOR MANAGING THE COMPUTING RESOURCES OF A CLOUD COMPUTING PLATFORM

FIELD

The present invention relates to a method and a system for managing the computing resources allocated to a cloud computing platform running at least one software application.

BACKGROUND

Over the past few years, the distribution of services/applications through a cloud computing platform has become mainstream. The main advantage of cloud computing is that it abstracts most of the concerns relating to the physical hardware and/or software resources, thus enabling users to concentrate on their core business instead of focusing on the maintenance and deployment of data centres. The cloud computing model is based on providing a user with access to physical computing resources on a pay-as-you-go basis, whereby the user pays for the started computing resources to run the services/applications on the cloud computing platform. As the demand for the cloud operated services/applications changes, the underline physical resources can be dynamically scaled to meet the computing needs of the cloud services/applications at any given time.

Operating a data centre can be highly expensive, and thus to make the cloud computing model profitable, cloud computing providers, also referred to as Infrastructure as a Service (IaaS) providers, are using the concept of virtualisation to allow multiple users to share the same underline physical computing resources. Virtualisation enables the partition of the hardware and/or software resources into isolated Virtual Machine (VM) instances, which can be assigned to a user on demand to run applications and/or services on the cloud computing platform.

In general, the quality of service and cost for running a cloud service and/or application on the cloud computing platform, is highly dependent on the physical computing resources consumed by the allocated VM instances. Therefore, it is essential to efficiently manage the allocation of physical resources according to the demand experienced by the service and/or application, to maintain a balance between quality of service and cost.

In existing solutions, the allocation of physical resources is generally based on monitoring the resource utilization, e.g. CPU utilisation, of each VM instance, running the cloud service and/or application. The utilisation of the computing resources allocated to each VM instance would vary according to the demand of the service and/or application hosted therein. However, monitoring the utilization of each VM instance may lead to a delayed response in scaling the computing resources to meet variation in user demand, which may cause the VM instances to be operated outside of their target value range for a period of time, leading to a reduced level of service and/or higher cost.

Therefore, one of the main concerns associated with the use of cloud computing platforms is the need to ensure that the allocated physical resources are dynamically and quickly adjusted to meet variations in the user demand experienced by the service and/or application.

SUMMARY OF THE INVENTION

An object of the present invention is to provide a method and a system for managing the physical computing resources, hardware and/or software, of a cloud computing platform so that they are quickly and dynamically adjusted according to user demand variations experienced by the service and/or application.

According to a first aspect of the present invention, a system for managing the computing resources of a cloud computing platform comprising a plurality of Virtual Machine (VM) clusters each comprising a plurality of Virtual Machine (VM) instances, each VM instance being provisioned on at least one host device of at least one service provider and configured to run at least one software application instance, the cloud platform is accessible via a communication interface configured to receive user requests for accessing at least one software application running on at least one of the plurality of VM clusters. The system comprises: a monitoring module configured for determining a resource utilisation value for each VM instance in each VM duster; and an elasticity module configured for adjusting the number of VM instances and/or software application instances in each VM duster by requesting the provision or deletion of VM instances and/or software application instances so that the resource utilisation value of each VM instance in each VM duster is maintained within a target value range; wherein the monitoring module is configured to determine, based on the user requests received at the communication interface, a cluster resource utilisation value; wherein the elasticity module is configured for adjusting the number of VM instances and/or software application instances based on at least the duster resource utilisation value so as to maintain the resource utilisation value of each VM instance within the target value range.

It has been found that by adjusting the number of VM instances and/or software application instances based on at least the cluster resource utilisation value, has the advantage that the allocated computing resources can be more efficiently scaled to meet the demand of provided cloud service and/or application compared to existing solutions. Scaling of computing resources may involve the allocation and/or deallocation of computing resources e.g. processors, and/or memory, from at least one Infrastructure as a Service (IaaS) provider to the VM cluster by increasing and/or reducing the number of VM instances and/or software application instances in the desired VM cluster according to at least the cluster resource utilisation value. In the present invention, the cluster resource utilisation value is determined based on the user requests received at the communication interface for a requested service and/or application. The cluster resource utilisation value may indicate the utilisation of the VM cluster resources, which may be determined based a comparison between the incoming user requests and the resource configuration of the VM cluster, e.g. the number of VM and/or software application instances. By calculating the resource utilisation based on the user traffic received at the communication module, rather than relying on the workload of the VM instances alone as it is the case with prior art solutions, the elasticity module may quickly react to variations in the user traffic. by adjusting the number of VM instances and/or software instances in the VM clusters to meet the demand indicated by the incoming user requests, thereby ensuring the ongoing operation of the platform. The elasticity module may use the resource utilisation value of each VM instance to optimise the scaling of the computing resources further so that it closely matches the user demand for the application. For example, the elasticity module may determine, based on the duster resource utilisation value calculated by the monitoring module, the number of VM instances required for handling the incoming user traffic so as to maintain the resource utilisation of each VM instances within a target value range. As a result, with the present invention, it is possible to quickly and dynamically scale the computing resources of the cloud computing platform to meet variations in the user demand for the hosted application and/or service, thus maintaining the desired quality of service and cost at the desired level.

According to embodiments of the present invention, the plurality of VM clusters are divided into VM cluster regions. For example, the VM duster regions of the computing platform may be distributed in different geographical regions, thereby improving accessibility to the cloud computing platform by users located in different geographical regions. Furthermore, the provision of different VM cluster regions may improve reliability and resiliency of the cloud computing platform in the case of hardware failures.

According to embodiments of the present invention, each VM cluster in each VM cluster region comprises a monitoring module and an elasticity module According to embodiments of the present invention, the monitoring module in each VM cluster of a region is configured to receive information on the total VM instances instantiated in the VM duster region, and wherein the elasticity component is configured to adjust the number of VM instances for the VM cluster according to the generated resourced utilization value.

According to embodiments of the present invention, each VM cluster comprising short-term and long-term VM instances. According to embodiments of the present invention, the elasticity module is configured to adjust t the ratio between short-term and long-term VM instances in the VM cluster according to a VM cluster ratio value.

According to embodiments of the present invention, by adjusting the ratio, the elasticity module is configured to maintain the sum of the VM instances in a VM cluster at the number of VM instances determined based on the cluster resource utilisation value generated by the monitoring module It has been found that by integrating in each VM cluster a monitoring module and an elasticity module, the utilization value of the VM instances in a VM cluster may be better controlled by adjusting the number of VM instances according to a VM ratio value. The VM ratio value determines a ratio between long-term and short-term VM instances to satisfy the resource utilisation value of the VM cluster while ensuring that sufficient long-term VM resources are allocated to handle a withdrawal of short-term VM instances by the IaaS provider. In general, shot-term VM instances, also referred to as preemptible, are affordable, short-lived compute instances that may be withdrawn by the IaaS provider without sufficient notice in favour of another application. On the other hand, long-term VM instances are permanent resource allocated to an application at a higher cost. In order to reduce the cost of long-term VM instances, clients may enter into in a Committed Use Discounts (CUD) contract with an IaaS provider for the provision of certain amount of committed long-term computing resources at a lower price. Therefore, it may be preferable that a given ratio between long-term and short-term VM instances is maintained to ensure the continuous operation of the application e.g. the number of short-term VM instances at any given moment does not exceed a predetermined threshold value, which may be user or system defined. With the use of CUD contracts it is at the interest of the client to maximise the use of the committed long-term VM instances before requesting the instantiation of additional short-term and/or long-term VM instances. The elasticity module, based on information extracted by means of the monitoring module on the total number and/or types of VM instances instantiated in other VM clusters of a VM region, may adjust the VM ratio to ensure continuous operation while optimising the associated cost, by selecting the appropriate type of computing resources e.g. ratio between short-term and long-term computing resources. For example, in the case of high user traffic, the elasticity module may first check whether there is any spare capacity of committed long-term VM instances, and accordingly adjust the VM ratio between long-term and short-term VM instances to ensure continuous operation of the computing platform while optimising the overall cost associated with the computing resources. The elasticity module may adjust the ratio between short-term and long-term VM instances while maintaining the sum of all VM instances in a VM cluster within at the number of VM instances determined by the elasticity module based on the duster resource utilisation value generated. The number of total VM instances in a VM cluster may be adjustable based on the user traffic and/or defined by a user. The present invention offers optimisation and management of the computing resources allocated to each duster of a VM region at two levels, namely at the VM cluster level and VM region level. At the VM duster level, the present invention enables the determination, based on the duster utilisation value, of the total number of VM instances needed to handle the user traffic received at the communication logic, and accordingly, while maintaining the total number of VM instances, adjust the number of short term and long term VM instances to obtain the desired VM duster ratio in order to ensure the continuous operation of the platform. At the VM region level, the present invention enables the control of the total number of long-term VM instances according to CUD contract.

According to embodiments of the present invention, the monitoring module is configured to determine the cluster resource utilisation value based on incoming traffic generated by the user requests received at the communication interface. For example, the monitoring module may be configured to extract from the incoming user requests a set of key performance indicators associated with the requested software application instance and accordingly determine, based on the resource configuration of the VM duster running the requested software application instance, the duster resource utilisation value.

It has been found that by monitoring and analysing the traffic generated by the incoming user requests, it is possible to determine a cluster resource utilisation value, which can be used by the elasticity module to determine whether the VM instances and/or software instances of the VM clusters need to be adjusted. For example, the monitoring module may process the user requests to extract a set of key performance indicators such the type of software applications being requested, the CPU and memory requirements associated with the requested software application instance, and/or a duration of a user session, which session duration may be based on historical information. The monitoring module, based on extracted key performance indicators, and/or the resource configuration of each VM cluster, and/or the volume of user requests may determine the cluster resource utilisation value.

According to embodiments of the present invention, the elasticity module is configured to provision VM instances based on a VM configuration template stored in a system database. The configuration template comprises configuration data for the VM instances at least including CPU and memory allocation requirements. For example, the VM configuration template may comprise configuration data for configuring, depending on the requirements of the application, a short-term performance VM instance, which is provisioned to deal with short outburst of incoming user requests, and a long-term VM instances, which is provisioned to deal with long-term outbursts of incoming user requests.

Configuration templates ensure that VM instances are provisioned from the infrastructure service providers with a predetermined configuration. With configuration templates, system administrators can save a baseline configuration for any software application instance. Thus, a system administrator can create a template of baseline server configurations to expedite the deployment of servers in the cloud computing environment. Configuration templates can be created for file servers, application servers or Web servers or even "small" or "large" server configurations. It should be noted that different configuration templates may be used for the provisioning of VM instances with different configurations. The configuration template may comprise configuration data for configuring at least two types of VM instances, a short-term and a long-term performance VM instances. The short-term performance VM instance may be provisioned to deal with short outbursts of incoming user traffic and/or when an issue is encountered with a VM instance in the VM cluster. The long-term performance VM instance may be provisioned when establishing a base-line configuration for the VM cluster, or to deal with an increase in the incoming user traffic. Short-term performance VM instances may have short-term stability and may be terminated at a short notice. Long-term performance VM instances may have long-term stability and may be used for a prolonged period of time. The elasticity module may decide whether to provision short-term or long-term performance VM instances based on the duster resource utilisation value, which relates to the volume of user requests received at the communication interface module.

According to embodiments of the present invention, the elasticity module comprises an application control module configured to adjust the number of software application instances in the VM clusters, and a VM control module configured to adjust the number of VM instances in the VM clusters.

By providing the application control module and VM control module, allows for the software application instances to be separately adjusted from the VM instances. In this way, variation in the user demand can be met in a more flexible manner. For example, as long as the resource utilisation value of the VM instances remains within the target value, it is possible only to increase or decrease the software application instances in the VM duster to meet variations in the user demand for the desired application. Once the resource utilisation value of the VM instances reaches or exceeds the target value, then the VM control module may adjust the number of VM instances in the duster, thus adjusting the underlying computing resources. The process can be repeated until the physical resources are at the correct level to handle the incoming traffic of user requests.

According to embodiments of the present invention, the elasticity module comprises a service provider selection module configured to select a service provider for hosting the VM instances in the VM duster based on a set of provisioning criteria, which at least include the provisioning cost, the availability of computing resource, reliability, data security, and geographical location of the host devices. The selection module may be configured to determine the availability of each service provider for provisioning a VM instance by periodically issuing a test request for the provisioning of VM instances.

It has been found that the provision of a service provider selection module has the advantage that the VM instances can be quickly provisioned on different service providers depending on the requirements of the software application requested by the user. Provisioning criteria may be associated with a weighting factor that may guide the selection of a service provider for provisioning the VM instances. An administrator may define the provisioning criteria and associated weighting factors.

According to embodiments of the present invention, the system comprises a workload balancing module configured, based on the resource utilisation value, for distributing user requests in the VM cluster to maintain the resource utilisation value of each VM instance within the target value.

The workload balancing module ensures that the user requests are distributed among the software application instances in the VM cluster to maintain the resource utilisation experienced by each VM instance within a target value. The workload balancing module may be in the form of an Enterprise Service Bus (ESB) or another system with the desired functionality. The workload balancing module may distribute the workload based on the resource utilisation value of each VM instance. The computing resources of each VM cluster may be optimised by reallocating software application instances to VM instances that have the resources to cope with running additional software application instances, and their resource utilisation value is below or within the target value. By reallocating the software instances, it may be possible to reduce the number of VM instances operating the VM cluster, leading to cost savings while maintain the required quality of service.

According to embodiments of the present invention, the workload balancing module is configured for detecting the location of the users and accordingly distributing the user requests to VM instances provisioned on host devices located closer to each user.

By directing the user requests to VM instances provisioned on a hosted device located close to the location of the user has the advantage of increasing the speed of the software application and reduce the time required for propagating data between the users and the software application instances.

According to embodiments of the present invention, the workload balancing module comprises a data segregation logic configured to segregate the data processed by the software application instance into a public portion and private portion, the workload balancing module being configured for propagating at least the private portion of the requested software application to VM instances provisioned on a host device meeting the security criteria imposed by the software application.

The data segregation logic ensures that private data is handled by software applications run on VM instances that are hosted on host devices meeting the required privacy and security criteria to ensure that authorised users only access private data.

According to embodiments of the present invention, at least one of the VM dusters is configured to run a software application for determining the availability of travel products from a plurality of travel provider based on data received from at least a travel management system.

According to embodiments of the present invention, at least one of the VM dusters is configured to run a software application for pricing travel products from different travel service providers based on data received from at least a travel management system.

According to a second aspect of the present invention a method may be provided method for managing the computing resources of a cloud computing platform comprising a plurality of Virtual Machine (VM) clusters each comprising a plurality of Virtual Machine (VM) instances, each VM instance being provisioned on at least one host device of at least one service provider and configured to run at least one software application instance, the method comprising the steps of: receiving at a communication interface user requests for accessing at least one software application running on one of the pluralities of VM clusters of the cloud computing platform; determining by means of a monitoring module a resource utilisation value for each VM instance in the VM cluster; and adjusting by means of an elasticity module the number of VM instances and/or software application instances in the VM cluster by requesting the provision or deletion of VM and/or software application instances so that the resource utilisation value experienced by each of the VM instances in the VM cluster is maintained within a target value range; wherein the monitoring module is configured to determine, based on the user requests received at the communication interface, a cluster resource utilisation value; wherein the elasticity module is configured for adjusting the number of VM instances and/or software application instances based on at least the cluster resource utilisation value to maintain the resource utilisation value of each VM instance within the target value range.

BRIEF DESCRIPTION OF THE DRAWINGS

The following drawings are provided as an example to explain further and describe various aspects of the invention.

DETAILED DESCRIPTION

The present invention will be illustrated using the exemplified embodiments shown in the FIGS. 1 to 8, which will be described in more detail below. It should be noted that any references made to dimensions are only indicative and do not restrict the invention in any way. While this invention has been shown and described with reference to certain illustrated embodiments thereof, it will be understood by those skilled in the art that various changes in form and details may be made therein without departing from the scope of the invention. Furthermore, while the invention has been described with references to a particular system and/or a method for managing the computing resources of a cloud computing platform, it should be understood by those skilled in the art that changes in form and details may be made to facilitate other types of method and/or systems in related fields without departing from the scope of the invention.

Figure 1:
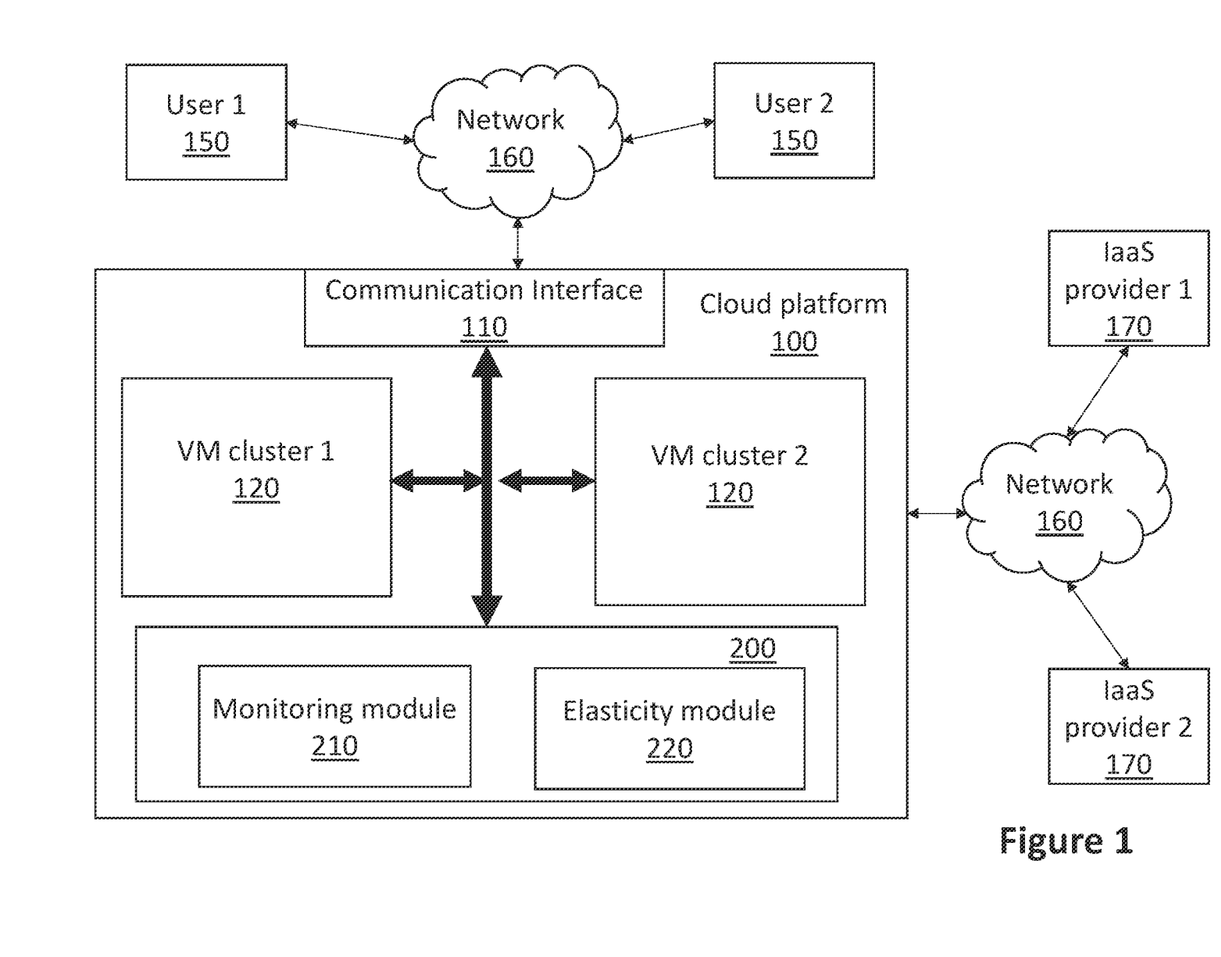
FIGS. 1 and 2 show an exemplified system for managing the computing resources of a cloud computing platform according to embodiments of the present invention.
Figure 2:
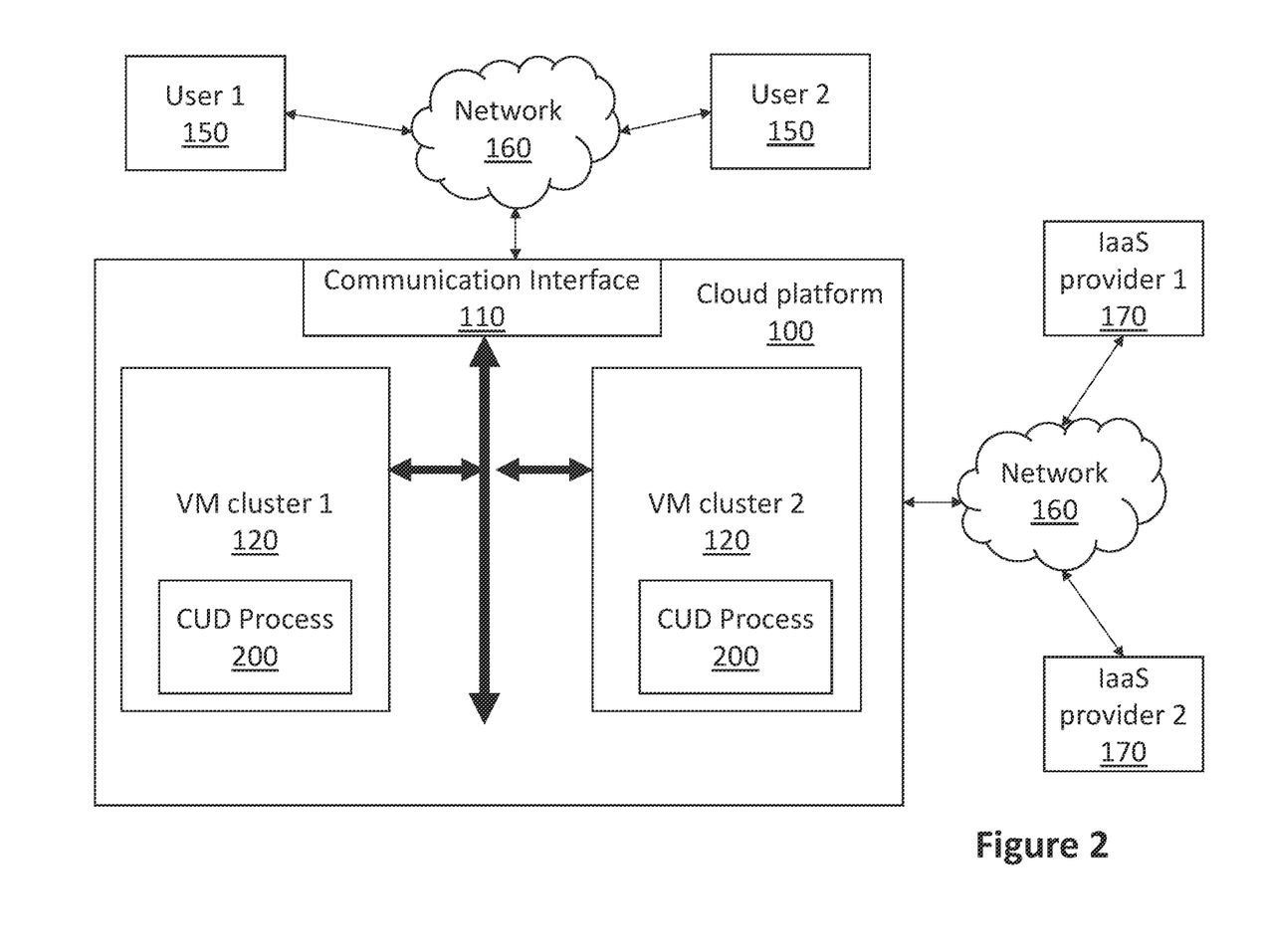
Figure 4:
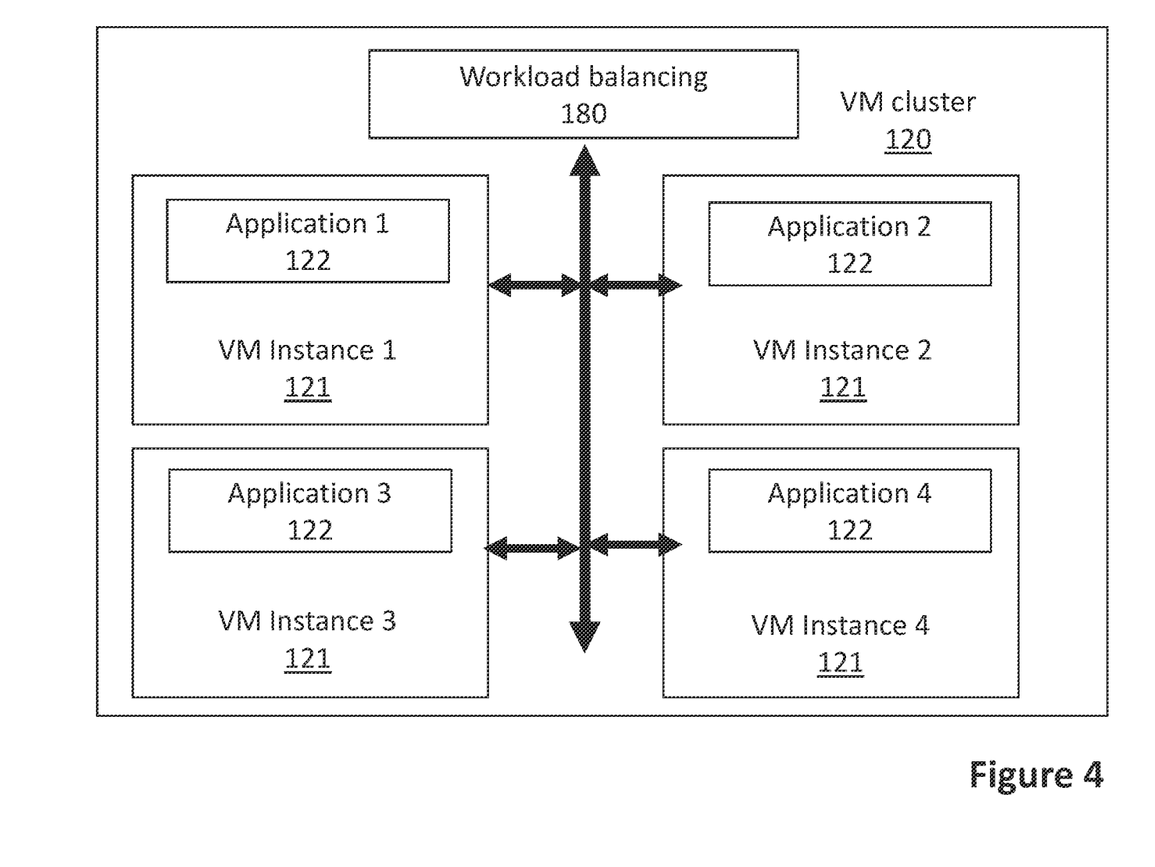
FIG. 4 shows an example of a VM cluster according to embodiments of the present invention.

FIGS. 1 and 2 show an example of a system 200 for managing the computing resources of a cloud computing platform 100 according to embodiments of the present. As shown in FIG. 1, the cloud computing platform 100 may comprise a communication interface 110 configured to receive requests from a plurality of users 150 through a network 160, e.g. the internet, for accessing at least one application instance 122 running on at least one Virtual Machine (VM) cluster 120, as shown in FIG. 4. Each VM cluster 120 in the cloud computing platform 200 comprises a plurality of Virtual Machine (VM) instances 121, each arranged to run at least one software application instance 122, as shown in FIG. 4. The VM instances 121 may be provisioned on a physical host server of an Infrastructure as a Service (IaaS) provider 170 and allocated physical computing resources, e.g. CPU, memory, Input/output devices, peripherals, operating software, and the like to support the operation of the software application instances 122 running on the VM instances 121. The exemplified system 200 of the present invention may be provided with a monitoring module 210 configured to determine at least a resource utilisation value for each VM instance 121 in the VM clusters 120, and a cluster resource utilisation value for each VM cluster 120 in the cloud computing platform 100. The VM instance resource utilisation value may indicate the utilisation of the underlying physical computing resources, e.g. CPU utilisation, memory utilisation, allocated to each VM instance 121 in each VM cluster 120. The VM cluster resource utilisation value may indicate the utilisation of the VM cluster resources, which may be determined based a comparison between the incoming user requests and the resource configuration of the VM cluster, e.g. the number of VM and/or software application instances. The VM instance resource utilisation value may be determined based on information obtained directly from the VM instances 121, e.g. CPU utilisation, while the VM duster resource utilisation value may be determined based on information extracted from the incoming user requests received at the communication interface module 110. Each VM instance 121 and/or each VM cluster may be provided with a target resource utilisation value e.g. a threshold, which when reached and/or exceed would indicate that the resources allocated to the cloud platform and/or the configuration of the VM cluster 120 would need to be adjusted to meet the user demand. For this purpose, an elasticity module 220 is provided, which is configured based on the cluster resource utilisation value, to adjust the number of VM instances and/or software instances so as to maintain the VM instances 121 and/or each VM duster within their respective target resource utilisation values. The elasticity module 220 may adjust the physical computing resources allocated to each VM cluster 120 by requesting, via a communication network 160, the provisioning or deletion of VM instances from the host devices of the respective IaaS providers 170. According to embodiments of the present invention, at least one system 200 for managing the computing resources, which may also be referred to as a CUD process, may be provided for collectively managing the computing resources of a collection of VM clusters 120, as shown in FIG. 1. The elasticity module 220 is configured, based on the cluster utilisation value calculated by the monitoring module 210, to determine the number of VM instances and associated computing resources required to handle the incoming user traffic received at the communication interface 110, so as to maintain the resource utilisation value of each VM instance 121 in the VM cluster within a target value.

Figure 3:
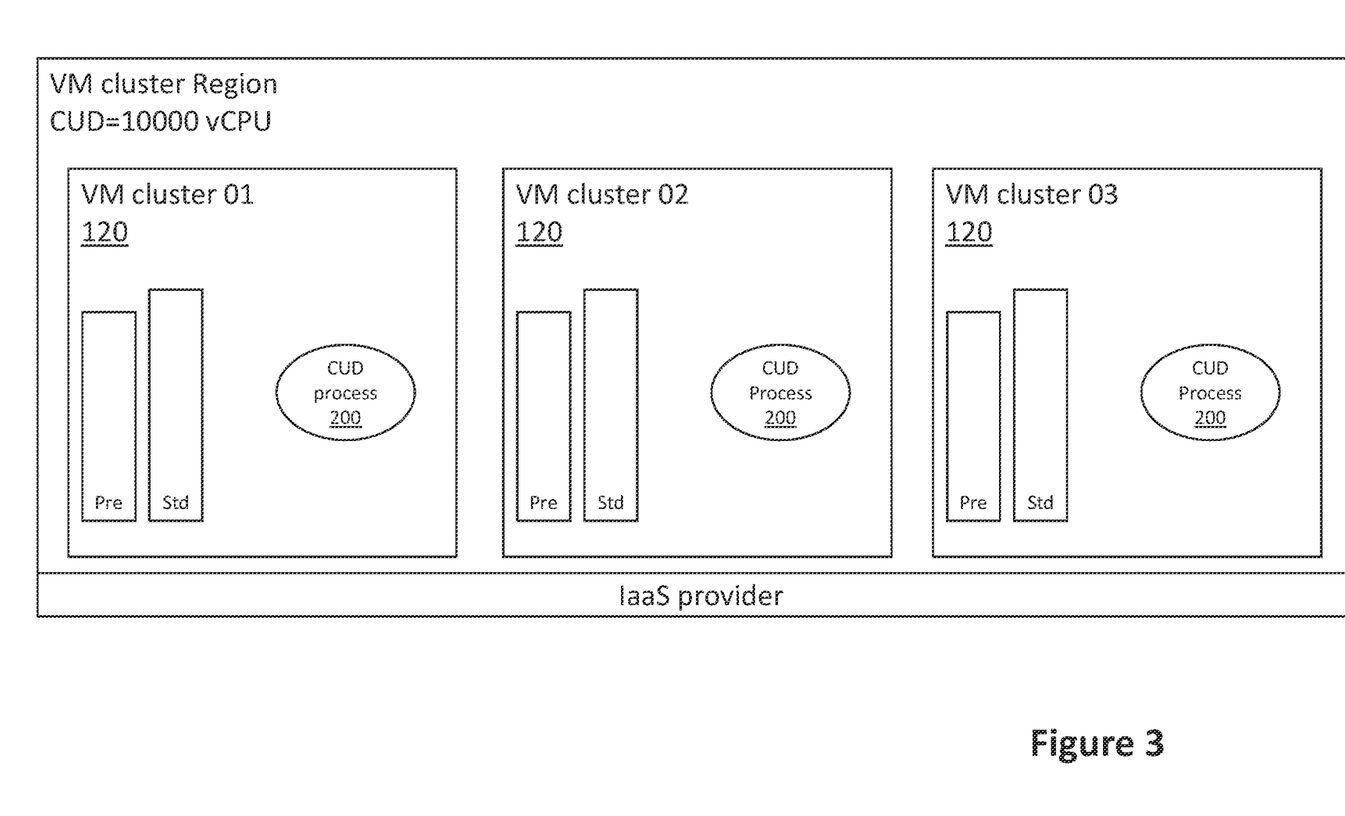
FIG. 3 shows an example of a VM cluster region according to embodiments of the present invention.

According to embodiments of the present invention, each VM cluster may be provided with a system 200 for managing the computing resources as shown in FIG. 2. In this arrangement, which may work in combination with the embodiment shown in FIG. 1, the monitoring module 210 in each VM cluster may be configured for receiving VM instance information regarding the number and/or type of VM instances instantiated in the other VM clusters 120 of the cloud platform 100. The VM instance information may also be obtained from a CUD process 200, such as the one shown in FIG. 1, which can act as an orchestrator. The elasticity module 220, based on the VM instance information received may optimize and adjust the number of VM instances to meet the resource utilization value of the VM instances 121 in the VM cluster 120, based on the cluster utilisation value determined by the monitoring module 210. The VM instance information may be received from the IaaS provider, e.g. a CUD process 200 in a VM cluster of regions may request periodically from the IaaS provider the VM instance information for the region. The VM instance information may comprise the number of total VM instances used in a VM duster region, and/or the ratio between long-term VM instances, which may be referred to as standard VM instances, and short-term VM instances, also referred to as preemptible. In many cases, the long-term VM instances are guaranteed computing resources, which are assigned by the IaaS provider to the client at a higher cost. In order to reduce the cost, the client may enter into a Committed Use Discounts (CUD) contract with the IaaS provider for the purchase of a certain amount of committed VM computing resources e.g. vCPUs, memory, GPUs, and local SSDs, at a discounted price. On the other hand, preemptible VM instances, are on-demand computing resources that are used in the case of a surge in the user demand that cannot be handled by guaranteed long-term VM instances. One of the characteristics of the preemptible VM instances is that the IaaS provider may unexpectedly reallocate the computing resources to another process, which may cause issues with meeting the user demands. Therefore, in order to maintain the operation of the software application running on the cloud platform it is may be best to maintain a balance between the number of preemptible and long-term VM instances while maximising the amount of committed VM computing resources, in the case of a CUD contract. For example, as shown in FIG. 3 the elasticity module 220 may adjust the VM instances in each VM cluster of a region according to a VM cluster ratio between short-term and long-term VM instances. In this way, it is possible to fulfil the committed VM capacity agreed in the CUD contract, by distributed the number committed long-term VM instances across the VM clusters of a region such that the VM cluster ratio of each cluster is within the target value, while satisfying the user demand. At the same time, the elasticity module may adjust the ratio between short-term and long-term VM instances such that the sum of all VM instances in a VM cluster is maintained at the specified value, which may be defined based on the user traffic and/or by a user. With the use of the local CUD process 200 it may be possible to adjust locally in each VM cluster 120 the VM computing resources, in order to handle the incoming traffic received at the communication interface 110, while optimising the associated costs by adjusting the ratio between the short-term and long-term VM instances 121.

An example according to the present invention will be given here, for illustration purpose only. A VM cluster 120 may be provided with thirty VM instances 121, each assigned a resource utilisation value associated with the at least the CPU utilisation which should be kept within a target value range, e.g. between 50 to 80%, of which 50% is the low band, and 80% is the high band. For the VM cluster 120, the VM cluster resource utilisation may be associated with the traffic of incoming user request received at the communication interface. According to this example, if the monitoring module 210 detects that the resource utilisation value of at least one VM instance 121 is above a predetermined threshold, e.g. the CPU utilisation is at 100%, the elasticity module 220 may then decide to increase the VM instances 121 in the VM duster 120 to ensure that the resource utilisation of the VM instance 121 is brought back within the target value range. It is also possible to decide such an increase only if the CPU utilisation of each of the VM instances 121 reaches a predetermined threshold, e.g. a CPU utilisation of at least 50%, the low band value. Once the elasticity module 220 has decided to increase the number of VM instances 121, the exact number of VM instances 121 to be added to the VM cluster 120 would be determined using the traffic of incoming user requests received at the communication interface 110. Each VM instance 121 may be configured to manage a predetermined amount of incoming user traffic, which may be defined by the data size of the user requests or the number of user requests received at the communication interface, e.g. 100 user requests/per second. The elasticity module 220, knowing the amount of incoming user traffic that can be handled by each VM instance 121, and given an incoming user traffic received at the communication interface 110 of say 3300 user requests, would determine, based on a ratio calculation, that the number of VM instances 121 in the VM cluster 120 should be increased from thirty to thirty-three in order to maintain the VM cluster utilisation value within the target value. The calculation may be based in dividing the incoming user traffic with the amount of traffic that can be handled by each VM, e.g. 3300/100=33 VM instances 121. In the case, where at least one of the VM instances 121 has reached or exceeded its resource utilisation value, but the ratio calculation indicates that the number of VM instances 121 required to handle the incoming user traffic is less than the number of VM instances 121 in the VM cluster 120, then the elasticity module 220 may still decide to increase the number of VM instances 121 by a certain amount e.g. one, in order to bring the resource utilisation value of the affected VM instances within the target value. Moreover, if only a certain amount of VM instances 121 experience high resource utilisation, it may be possible to increase the software application instances 122 and/or redistribute the incoming traffic request among the VM instances 121 in the VM cluster in order to bring the resource utilisation value of the affected VM instances within the target value.

FIG. 4 shows an example of a VM cluster 120 implementation according to embodiments of the present invention. The VM cluster 120 may be provided with a plurality VM instances 121 each configured to run at least one software application instance 122, which may be part of a distributed software application. In another example, each VM instance 121 may be configured to run different software application instances 122. Each VM cluster may be provided with a workload balancing module 180, which may be configured to distribute the user requests among the VM instances 121 running the requested software application 122 so as to maintain the resource utilisation value of each VM instance 121 within its target value range. The target resource utilisation value for the VM instances 121, maybe a user-defined value or may be established during provisioning.

Figure 5:
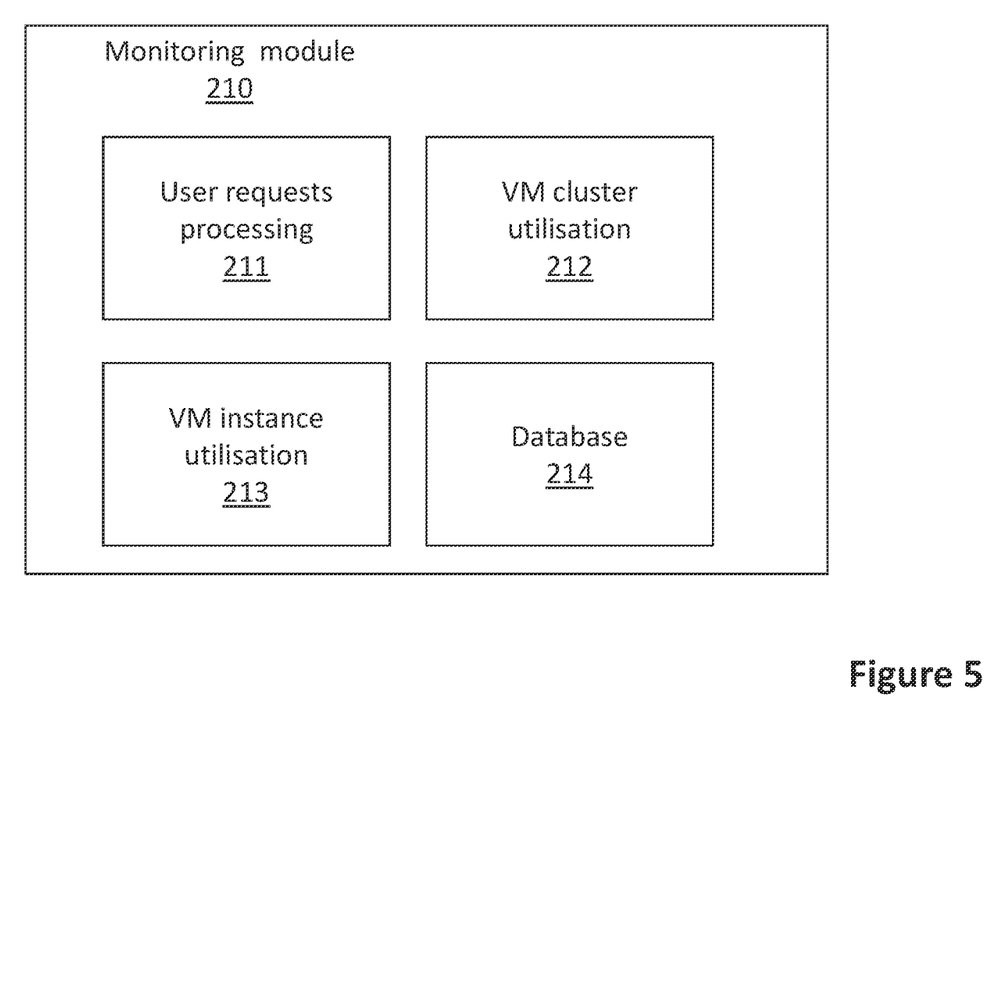
FIG. 5 shows an example of a monitoring module according to embodiments of the present invention.

FIG. 5 shows an example of a monitoring module 210 according to embodiments of the present invention. The monitoring module 210 may be provided with a processing module 211 for processing the user requests to extract a set of key performance indicators, which may be used to determine the cluster resource utilisation value. It should be noted that the key performance indicators may also be determined in the communication interface module 110. The key performance indicators may at least include, but not limited, to the type of software applications being requested, the CPU and memory requirements associated with the requested software application instance, and/or a duration of a user session, which session duration may be based on historical information. The monitoring module 210, may be provided with a VM cluster utilisation module 212 which may be configured for determining the cluster resource utilisation value, based on the extracted key performance indicators and the configuration of each VM cluster, e.g. the number of VM instances 121 and/or software application instances 122. The monitoring module 210 may be provided with a VM instance utilisation module 213, which may be configured for monitoring each VM instance 121 to determine a resource utilisation value, which may be indicative of how the allocated computing resources, e.g. CPU allocation, memory allocation, and the like are utilised by the software application instance 122. A database 214 may be provided to store the VM instance resource utilisation values, cluster utilisation values, VM cluster configuration data received from the elasticity module, VM cluster target value ranges, and VM instance target value ranges, and other information.

Figure 6:
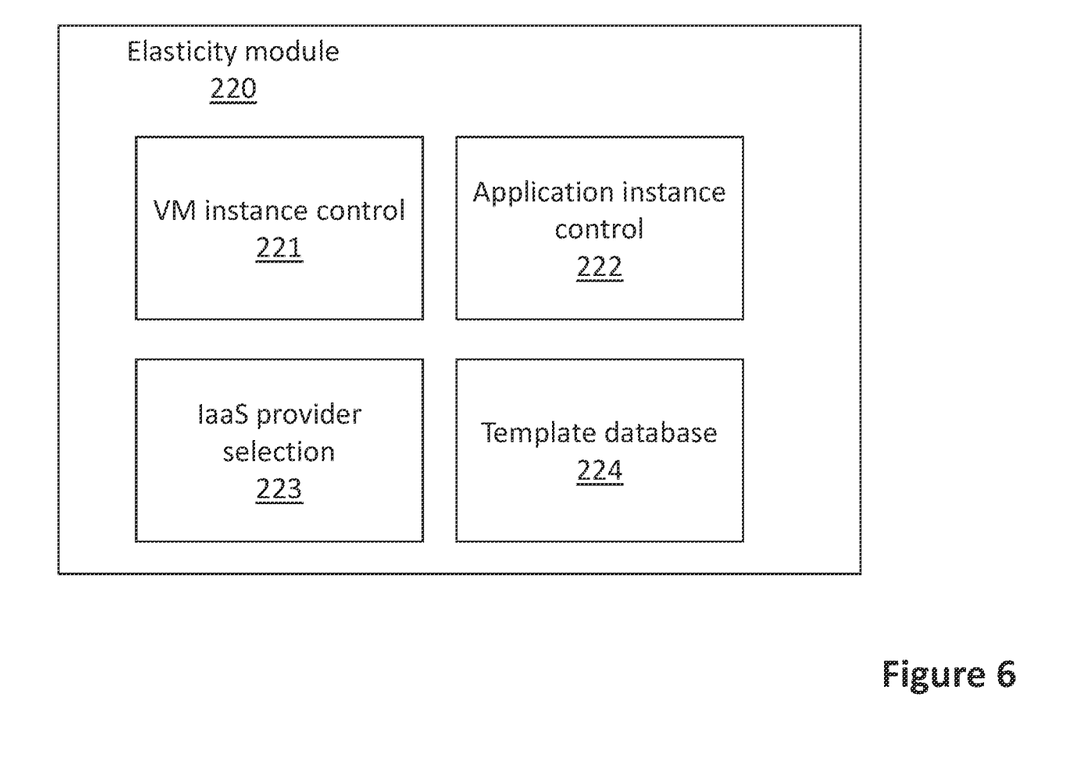
FIG. 6 shows an example of an elasticity module according to embodiments of the present invention.

FIG. 6 shows an example of an elasticity module 220 according to embodiments of the present invention. The elasticity module 220 may be provided with a VM instance control module 221, which may be configured to adjust the number of VM instances 121 in the VM cluster 120 by allocating or deallocating computing resources from the IaaS provider 170. An application instance control module 222 may be provided to adjust the number of software application instances 122 in the VM cluster 120. For example, in the case of a distributed cloud application, the number of software instances 122 may be increased or reduced, depending on the resource utilisation value of each VM instance 121, to handle the incoming user requests. An Infrastructure as a Service (IaaS) provider selection module 181 may be provided to select the host devices for provisioning VM instances 121. Each IaaS service provider 170 may have different service characteristics when it comes to the cost of provisioning, reliability, data security, availability, and the like. Therefore, depending on the requirements of the cloud operated application it may be necessary to select an IaaS provider 170 to provision the VM instances 121. In some cases, it may be necessary to provision instances from more than one IaaS provider, e.g. due to the location of the host devices, availability of resources, security. The service provider selection module 223 may be provided with a set of criteria for selecting an IaaS provider 170. The criteria may be prioritised using a weighting factor so that the most suitable IaaS provider 170 is selected that satisfy the requirements of the software application. For example, if cost and availability are identified as the most important criteria, then the cheapest IaaS provider 170 with available resources will always be selected. The IaaS provider selection module 223 may periodically test the availability of each IaaS provider 170 by issuing a test provisioning request. The provisioning of the VM instances may be performed automatically based on a configuration template, which includes configuration data related to the physical resources to be allocated. More than one configuration template may be used for provisioning VM instances 121 depending on the requirements of the software application and/or variations in the user demand. The configuration templates may be stored in a template database 224. The VM clusters 120 of the cloud computing platform 100 may contain VM instances 121 provisioned from different IaaS providers 170 using different configuration templates. The configuration templates may comprise configuration data for configuring at least two types of VM instances 121, a short-term and a long-term performance VM instances. The short-term performance VM instance may be provisioned to deal with short outbursts of incoming user traffic and/or when an issue is encountered with a VM instance 121 in the VM cluster 120 e.g. a VM instance is unexpectedly terminated. The long-term performance VM instance may be provisioned when establishing a base-line configuration for the VM cluster 120, or to deal with an increase in the incoming user traffic. Short-term performance VM instances may have short-term stability and may be terminated at a short notice e.g. their underlying computing resources may be pulled by the IaaS provider 170 to another service without prior notice. Long-term performance VM instances may have long-term stability and may be used for a prolonged period of time. Long-term VM instances may be provisioned on IaaS providers 170 that guarantee stability and/or reliability of the computing resources. The elasticity module 220 may decide whether to provision short-term or long-term performance VM instances 121 based on the cluster resource utilisation value, which relates to the volume of user requests received at the communication interface module.

Figure 7:
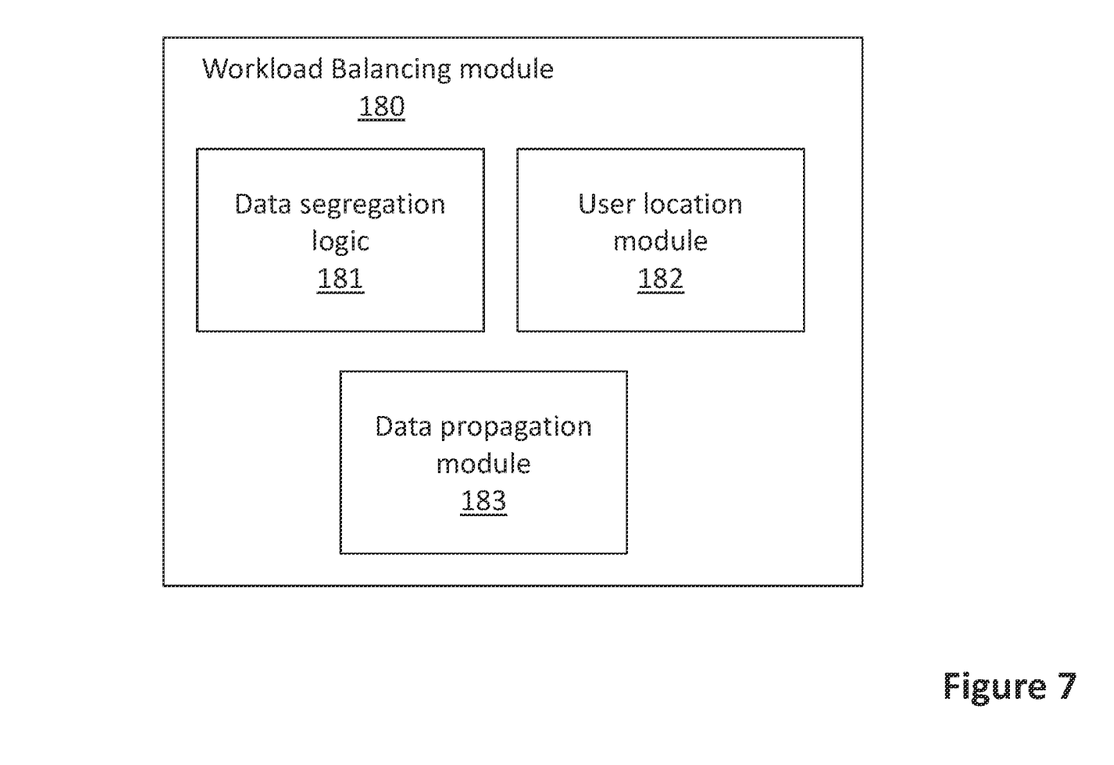
FIG. 7 shows an example of a resource utilisation balancing module according to embodiments of the present invention.

FIG. 7 shows an exemplified implementation of a workload balancing module 180 according to embodiments of the present invention. The workload balancing module 180 may be in the form of an Enterprise Service Bus (ESB) or another system with similar functionality. The workload balancing module 180 may be configured to distribute the workload generated from the user requests among the VM instances 121 of the VM cluster, so as to maintain the resource utilisation value of each VM instance 121 within its target value. The workload balancing module 180 may be distribute the workload based on the resource utilisation value of each VM instance 121. The computing resources of each VM cluster 120 may be optimised by reallocating software application instances 122 to VM instances 121 that have the resources to cope with running additional software application instances 122, and their resource utilisation value is below or within the target value. By reallocating the software instances, it may be possible to reduce the number of VM instances operating the VM cluster 120, leading to cost savings while maintain the required quality of service. The reallocation of the software application instances 122 may be performed by the elasticity module 220 and/or the workload balancing module 180. The workload balancing module 180 may be provided with a user location module 182 which is configured to identify the location of the user issuing the request for accessing the application, e.g. via the user IP address. A data propagation module 183 may be provided for propagating the data, based on the identified location, to VM instances hosted on a host device that is located closer to the user location, which may reduce the latency experienced by the user for accessing the desired application. A segregation logic 181 may be provided for separating the data processed, and/or generated, and/or transmitted by the application and/or the user into a public portion and a private portion. The data propagation module 183 may be configured for directing at least the private data portion of the data to VM instances 121 hosted on host devices of an IaaS provider 170 having the requirements security attributes for handling data securely.

Figure 8:
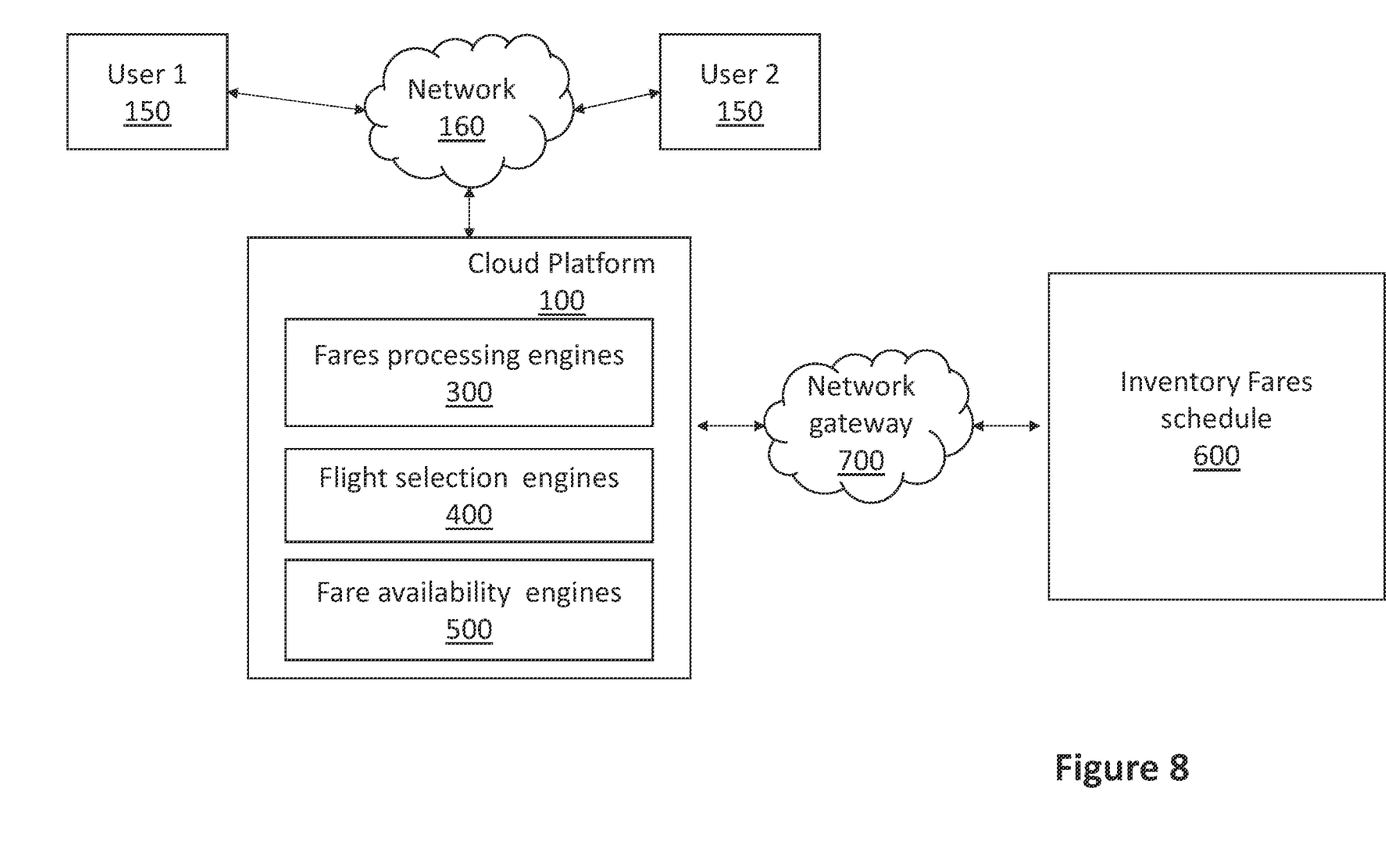
FIG. 8 shows an example of a cloud computing platform configured to run a plurality of applications according to embodiments of the present invention.

FIG. 8 shows an exemplified cloud architecture providing travel related services according to embodiments of the present invention. As shown in FIG. 6, in a cloud platform 100 a plurality of travel applications may be provided, each configured to perform a specific task. For example, the cloud platform 100 may be configured as a travel shopping platform, which is accessible by users 150 through a network 160, e.g. the internet. The travel shopping platform 100 may be provided with a flight selection engine 400, which is configured for enabling the user to search for flights or other travel products from different travel providers. The users 150 may enter a range of criteria in a search engine, e.g. dates, time, price, etc. and the flight selection engine 300 may search, through a network gateway 700, in a fare inventory schedule 600 of an external travel management system e.g. Global distribution System (GDS), to identify flights matching the user search criteria, which are forwarded to the users for selection. The users may select a desired flight, the information of which is transmitted to a fare processing engine 300, whereby a price for the travel product is calculated. Once the fare data is calculated, the availability of the fare needs to be verified. This step may be performed by a fare availability engine 500 application. When the availability of the fare is verified, then it can be forwarded to the user for booking. Traditionally, these types of applications were part of travel management system running on a physical computing server device. However, with the advent of cloud computing a big part of the travel booking process may be performed on a cloud platform of an IaaS provider, thus alleviating the needs for maintaining large data centres. For security, a part of the process involving the storing of critical data, e.g. the travel fares negotiated prices, and the like may still be operated by an actual hosted device of a travel service provider.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. The computer readable program instructions for carrying out operations of the embodiments of the invention may be, for example, assembly language or either source code or object code is written in any combination of one or more programming languages.

The program code embodied in any of the applications/modules described herein is capable of being individually or collectively distributed as a program product in a variety of different forms. In particular, the program code may be distributed using the computer readable storage medium having the computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other robust state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general-purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the invention. Moreover, any of the flowcharts, sequence diagrams, and/or block diagrams may include more, or fewer blocks than those illustrated consistent with embodiments of the invention.

The invention claimed is:

1. A system for managing the computing resources of a cloud computing platform comprising a plurality of Virtual Machine (VM) clusters each comprising a plurality of Virtual Machine (VM) instances including preemptible VM instances and standard VM instances, each VM instance being provisioned on at least one host device of at least one service provider and configured to run at least one software application instance, the cloud platform being accessible via a communication interface configured to receive user requests for accessing at least one software application running on at least one of the plurality of VM clusters, the system comprising:
   a monitoring module configured to determine:
   (i) a resource utilisation value for each VM instance in each VM cluster; and (ii) a cluster resource utilisation value for each VM cluster, the cluster resource utilisation value based on a volume of the user requests received for the VM cluster; and an elasticity module configured to:

determine whether the resource utilisation value for at least one of the VM instances exceeds a threshold;

when the resource utilisation value for at least one of the VM instances exceeds the threshold, adjust the number of VM instances in each VM cluster, based on at least the cluster resource utilisation value determined by the monitoring module, by requesting the provision or deletion of VM instances so that the resource utilisation value of each VM instance in each VM cluster is maintained within a target value range; and adjust the ratio between preemptible and standard VM instances in the VM cluster according to a VM cluster ratio value.

2. A system according to claim 1, wherein the plurality of VM clusters are divided into VM cluster regions.

3. A system according to claim 2, wherein each VM cluster in each region comprises a monitoring module and an elasticity module.

4. A system according to claim 3, wherein the monitoring module in each VM cluster of a region is configured to receive information on the total VM instances instantiated in the VM cluster region, and wherein the elasticity module is configured to adjust the number of VM instances for the VM cluster according to the generated cluster resource utilization value.

5. A system according to claim 1, wherein by adjusting the VM cluster ratio value, the elasticity module is configured to maintain the sum of the VM instances in a VM cluster at the number of VM instances determined by the elasticity module based on the cluster resource utilisation value generated by the monitoring module.

6. A system according to claim 1, wherein the VM cluster ratio is based on a committed VM usage value of standard VM instances, and wherein the elasticity module is configured for adjusting the number of standard VM instances in each cluster of a region so that the total number of standard VM instances in the region is within the committed usage value.

7. A system according to claim 1, wherein the monitoring module is configured to extract from the user requests a set of key performance indicators associated with the requested software application instance and accordingly determine, based on the configuration of the VM instances in the VM cluster running the requested software application instance, the cluster resource utilisation value.

8. A system according to claim 1, wherein the elasticity module is configured to provision VM instances based on at least one VM configuration template stored in a system database.

9. A system according to claim 8, wherein the configuration template comprises configuration data for the VM instances at least comprising CPU and memory allocation requirements.

10. A system according to claim 8, wherein the VM configuration template may comprise configuration data for configuring, depending on the requirements of the application, a preemptible VM instance, and a standard VM instances.

11. A system according to claim 1, wherein the elasticity module comprises an application control module configured to adjust the number of software application instances in the VM clusters, and/or a VM instance control module configured to adjust the number of VM instances in the VM clusters.

12. A system according to claim 1, wherein the elasticity module comprises a service provider selection module configured to select a service provider for hosting the VM instances in the VM cluster based on a set of criteria, which at least include the provisioning cost, the availability of computing resource, reliability, data security, and geographical location of the host devices.

13. A system according to claim 12, wherein the service provider selection module is configured to determine the availability of each service provider for provisioning a VM instance by periodically issuing a test provisioning request.

14. A system according to claim 1, wherein each VM cluster comprises a workload balancing module configured, based on the resource utilisation value, for distributing user requests in the VM cluster to maintain the resource utilisation value of each VM instance within the target value.

15. A system according to claim 14, wherein the workload balancing module is configured for detecting the location of the users and accordingly distributing the user requests to VM instances provisioned on host devices located closer to each user.

16. A system according to claim 14, wherein the workload balancing module comprises a data segregation logic configured to segregate the data processed by the software application instance into a public portion and private portion, the workload balancing module being configured for propagating at least the private portion of the requested software application to VM instances provisioned on a host devices meeting the security criteria imposed by the software application.

17. A system according to claim 1, wherein at least one VM cluster is configured to run a software application instance for determining the availability of travel products from a plurality of travel provider based on data received from at least a travel management system.

18. A system according to claim 1, wherein at least one of the VM clusters is configured to run a software application instance for pricing travel products from different travel service providers based on data received from at least a travel management system.

19. A method for managing the computing resources of a cloud computing platform comprising a plurality of Virtual Machine (VM) clusters each comprising a plurality of Virtual Machine (VM) instances including preemptible VM instances and standard VM instances, each VM instance being provisioned on at least one host device of at least one service provider and configured to run at least one software application instance, the method comprising the steps of:

receiving at a communication interface user requests for accessing at least one software application running on at least one of the plurality of VM clusters of the cloud computing platform; and at each VM cluster determining, at a monitoring module:

(i) a resource utilisation value of each VM instance; and (ii a cluster resource utilisation value, the cluster resource utilisation value based on a volume of the user requests received for the VM cluster;

determining, at an elasticity module, whether the resource utilisation value for at least one of the VM instances exceeds a threshold;

when the resource utilisation value for at least one of the VM instances exceeds the threshold, adjusting, at the elasticity module, the number of VM instances in the VM cluster, based on at least the cluster resource utilisation value determined by the monitoring module, by requesting the provision or deletion of VM instances so that the resource utilisation value experienced by each of the VM instances in the VM cluster is maintained within a target value range; and at the elasticity model, adjusting the ratio between pre-emptible and standard VM instances in the VM cluster according to a VM cluster ratio value.

* * * * *